(12) United States Patent
Watanabe et al.

(10) Patent No.: US 11,525,694 B2
(45) Date of Patent: Dec. 13, 2022

(54) SUPERIMPOSED-IMAGE DISPLAY DEVICE AND COMPUTER PROGRAM

(71) Applicant: AISIN CORPORATION, Kariya (JP)

(72) Inventors: Kenji Watanabe, Okazaki (JP); Hiroyuki Miyake, Toyota (JP)

(73) Assignee: AISIN CORPORATION, Kariya (JP)

( * ) Notice: Subject to any disclaimer, the term of this patent is extended or adjusted under 35 U.S.C. 154(b) by 182 days.

(21) Appl. No.: 16/649,508

(22) PCT Filed: Jul. 19, 2018

(86) PCT No.: PCT/JP2018/027053
§ 371 (c)(1),
(2) Date: Mar. 20, 2020

(87) PCT Pub. No.: WO2019/097762
PCT Pub. Date: May 23, 2019

(65) Prior Publication Data
US 2020/0249044 A1    Aug. 6, 2020

(30) Foreign Application Priority Data
Nov. 17, 2017    (JP) .............................. JP2017-222170

(51) Int. Cl.
*G01C 21/36*    (2006.01)
*B60K 35/00*    (2006.01)
*G01C 21/34*    (2006.01)

(52) U.S. Cl.
CPC ............ *G01C 21/365* (2013.01); *B60K 35/00* (2013.01); *G01C 21/343* (2013.01);
(Continued)

(58) Field of Classification Search
CPC ............. G01C 21/365; G01C 21/3415; G01C 21/343; B60K 35/00; B60K 2370/1529
See application file for complete search history.

(56) References Cited

U.S. PATENT DOCUMENTS 7,489,303 B1 * 2/2009 Pryor .................... G01C 21/265
345/184
8,558,758 B2 * 10/2013 Sato ......................... G03B 5/00
345/9
(Continued)

FOREIGN PATENT DOCUMENTS

EP    3031656 A1 *  6/2016 ............. B60K 35/00
EP    3246664 A2 * 11/2017 ............. B60K 35/00
(Continued)

OTHER PUBLICATIONS

Oct. 9, 2018 Search Report issued in International Patent Application No. PCT/JP2018/027053.

*Primary Examiner* — Luis A Martinez Borrero
(74) *Attorney, Agent, or Firm* — Oliff PLC

(57) ABSTRACT

Superimposed-image display devices and programs superimpose an image on a surrounding environment in front of a vehicle so that the image can be visually identified. The image includes at least one of a first guidance image that prompts a driver to change driving operation and a second guidance image that does not prompt a driver to change driving operation. The second guidance image is displayed in a display mode in which the second guidance image more harmonizes in at least one of a location, brightness, and color with the surrounding environment than the first guidance image, the surrounding environment being a superimposition target.

6 Claims, 7 Drawing Sheets

(52) U.S. Cl.
CPC .. *G01C 21/3415* (2013.01); *B60K 2370/1529* (2019.05); *B60K 2370/166* (2019.05); *B60K 2370/347* (2019.05); *B60K 2370/349* (2019.05)

(56) References Cited

U.S. PATENT DOCUMENTS

| | | | | |
|---|---|---|---|---|
| 9,255,813 | B2* | 2/2016 | Liu | G06F 3/0304 |
| 10,132,633 | B2* | 11/2018 | Liu | G06F 3/011 |
| 10,353,532 | B1* | 7/2019 | Holz | G06F 3/04815 |
| 10,659,686 | B2* | 5/2020 | Trevor | H04N 5/23216 |
| 2012/0050138 | A1* | 3/2012 | Sato | G02B 27/01 |
| | | | | 345/4 |
| 2012/0224060 | A1* | 9/2012 | Gurevich | G06V 20/58 |
| | | | | 348/148 |
| 2013/0093788 | A1* | 4/2013 | Liu | G02B 27/017 |
| | | | | 345/633 |
| 2013/0142385 | A1* | 6/2013 | Mathieu | G01C 21/365 |
| | | | | 345/473 |
| 2014/0310739 | A1* | 10/2014 | Ricci | G06Q 20/321 |
| | | | | 725/75 |
| 2016/0117861 | A1* | 4/2016 | Liu | G06F 3/012 |
| | | | | 345/633 |
| 2017/0013188 | A1* | 1/2017 | Kothari | B60R 1/00 |
| 2017/0313248 | A1* | 11/2017 | Kothari | B60R 1/00 |
| 2017/0361759 | A1* | 12/2017 | Kim | B60Q 1/085 |
| 2018/0255290 | A1* | 9/2018 | Holzer | H04N 13/221 |
| 2019/0132575 | A1* | 5/2019 | Izumi | H04N 13/111 |
| 2019/0182415 | A1* | 6/2019 | Sivan | G06F 3/012 |
| 2019/0228558 | A1* | 7/2019 | Kobayashi | G06T 7/529 |
| 2019/0230280 | A1* | 7/2019 | Kikukawa | G06T 3/4053 |
| 2019/0238819 | A1* | 8/2019 | Furukawa | G06T 19/00 |
| 2019/0268612 | A1* | 8/2019 | Fukuyasu | H04N 21/21805 |
| 2019/0279381 | A1* | 9/2019 | Hasegawa | G06T 19/00 |
| 2019/0279447 | A1* | 9/2019 | Ricci | G06Q 20/145 |
| 2019/0287289 | A1* | 9/2019 | Araki | G06T 15/08 |
| 2019/0297258 | A1* | 9/2019 | Trevor | H04N 5/23216 |
| 2019/0304160 | A1* | 10/2019 | Izumi | H04N 13/117 |
| 2020/0320747 | A1* | 10/2020 | Izumi | G06T 5/50 |

FOREIGN PATENT DOCUMENTS

| | | | | |
|---|---|---|---|---|
| EP | 3300941 A1 * | 4/2018 | | B60K 35/00 |
| JP | H07-266923 A | 10/1995 | | |
| JP | 2005-138801 A | 6/2005 | | |
| JP | 2013-79930 A | 5/2013 | | |
| JP | 2017-32436 A | 2/2017 | | |
| JP | 2017-94882 A | 6/2017 | | |
| JP | 2017-181125 A | 10/2017 | | |
| WO | 2007/142084 A1 | 12/2007 | | |
| WO | WO-2014097404 A1 * | 6/2014 | | B60K 35/00 |

* cited by examiner

Shape of guidance image to be stored

SUPERIMPOSED-IMAGE DISPLAY DEVICE AND COMPUTER PROGRAM

TECHNICAL FIELD

Related technical fields include superimposed-image display devices and computer programs that provide vehicle travel assistance.

BACKGROUND

Conventionally, various means are used as information providing means for providing a vehicle occupant with various types of information for providing vehicle travel assistance such as route guidance and warnings against obstacles. Examples include display performed by a liquid crystal display installed on a vehicle and audio outputted from a speaker. In recent years, as one of such information providing means, there have been devices that provide information by displaying images which are superimposed on a surrounding environment (view) of a driver, such as a head-up display (hereinafter, referred to as HUD) and a windshield display (hereinafter, referred to as WSD).

For example, JP 2013-79930 A discloses display of a plurality of types of guidance images, such as an arrow indicating a vehicle's traveling direction along a guided route and marks representing genres of facilities, above a driver's head distanced from a road surface, using a HUD.

SUMMARY

Here, in a technique described in the above-described JP 2013-79930 A, a guidance image that prompts the driver to change driving operation (e.g., an arrow that provides guidance on a left or right turn) and a guidance image that does not prompt the driver to change driving operation (e.g., an arrow that provides guidance on traveling straight ahead) both have been displayed above the driver's head in the same display mode. As a result, the guidance image that does not prompt the driver to change driving operation, i.e., a guidance image that is less necessary to be visually identified upon performing a driving operation, is also displayed above the driver's head, and thus, there has been a problem that the driver feels annoyed by the guidance.

Exemplary embodiments of the broad inventive principles described herein provide a superimposed-image display device and a computer program that allow a driver to more clearly, visually identify a guidance image that should be visually identified upon performing a driving operation, whereas the driver is prevented from feeling annoyed by a guidance image that is less necessary to be visually identified upon performing a driving operation.

Exemplary embodiments provide superimposed-image display devices and programs that superimpose an image on a surrounding environment in front of a vehicle so that the image can be visually identified. The image includes at least one of a first guidance image that prompts a driver to change driving operation and a second guidance image that does not prompt a driver to change driving operation. The second guidance image is displayed in a display mode in which the second guidance image more harmonizes in at least one of a location, brightness, and color with the surrounding environment than the first guidance image, the surrounding environment being a superimposition target.

According to the superimposed-image display device and the computer program that have the above-described configurations, even when multiple guidance images are displayed, it becomes possible to allow the driver to more clearly, visually identify a guidance image that should be visually identified upon performing a driving operation. On the other hand, it becomes possible to prevent the driver from feeling annoyed by a guidance image that is less necessary to be visually identified upon performing a driving operation.

DETAILED DESCRIPTION OF EXEMPLARY EMBODIMENTS

Figure 1:
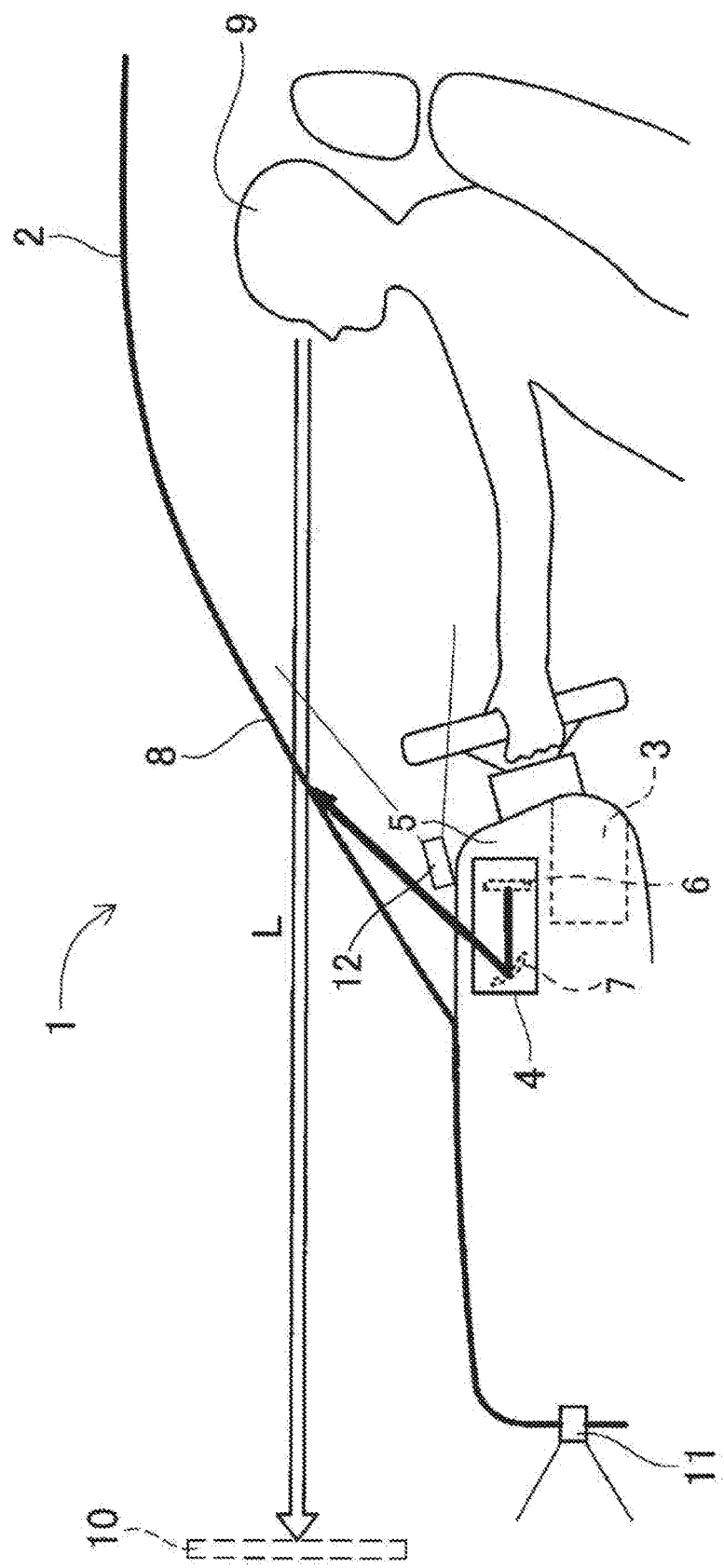
FIG. 1 is a schematic configuration diagram of a superimposed-image display device according to the present embodiment.

A superimposed-image display device will be described in detail below based on one embodiment in which the superimposed-image display device is embodied, and with reference to the drawings. First, a schematic configuration of a superimposed-image display device 1 according to the present embodiment will be described using FIG. 1. FIG. 1 is a schematic configuration diagram of the superimposed-image display device 1 according to the present embodiment.

As shown in FIG. 1, the superimposed-image display device 1 basically includes a navigation device 3 mounted on a vehicle 2; and a head-up display device (hereinafter, referred to as HUD) 4 which is mounted on the vehicle 2 likewise and connected to the navigation device 3.

Here, the navigation device 3 has the functions of searching for a recommended route to a destination, displaying a map image of an area around a current location of the vehicle 2 based on map data which is obtained from a server or stored in a memory, and providing guidance on traveling along a set guided route, with the HUD 4. Note that the navigation device 3 does not need to have all of the above-described functions, and will work with this system as long as the navigation device 3 has at least the function of providing guidance on traveling along a guided route. Note that details of a structure of the navigation device 3 will be described later.

On the other hand, the HUD 4 is installed in a dashboard 5 of the vehicle 2, and includes therein a liquid crystal display 6 which is a video display surface on which video is displayed. The HUD 4 is configured to allow an occupant 9 of the vehicle 2 to visually identify video projected onto the liquid crystal display 6, by allowing the video to be further reflected on a windshield 8 in front of a driver's seat through a concave mirror 7 included in the HUD 4, etc., as will be described later. Note that video to be displayed on the liquid crystal display 6 includes information about the vehicle 2 and various types of information used to assist in driving by the occupant 9. Examples include warnings against objects (other vehicles and pedestrians) which are warning targets for the occupant 9, a guided route set on the navigation device 3 and guidance information generated based on the guided route (an arrow indicating a left or right turn direction, etc.), warnings (collision warnings, speed limits, etc.) displayed on a road surface, current vehicle speed, advertising images, facility information, guidance signs, map images, traffic information, news, weather forecasts, time, a screen of a connected smartphone, and television programs.

In addition, the HUD 4 of the present embodiment is configured such that when video displayed on the liquid crystal display 6 is visually identified by the occupant 9 by being reflected on the windshield 8, the occupant 9 visually identifies the video displayed on the liquid crystal display 6, as a virtual image 10, at a distant location ahead of the windshield 8 instead of at the location of the windshield 8. In addition, the virtual image 10 is displayed so as to be superimposed on a surrounding environment (a view or a real view) in front of the vehicle, and for example, it is also possible to display the virtual image 10 such that the virtual image 10 is superimposed on an arbitrary object (a road surface, a construction, a moving object which is a warning target, etc.) located in front of the vehicle. Note that the virtual image 10 that can be visually identified by the occupant 9 is video displayed on the liquid crystal display 6, and the virtual image 10 may be inverted in its up-down direction or a left-right direction by passing through the concave mirror 7 or other mirrors, and thus, there is a need to display video on the liquid crystal display 6 taking into account those inversions. Note also that by the virtual image 10 passing through the concave mirror 7, the size of the virtual image 10 also changes.

Here, a location at which the virtual image 10 is created, more specifically, a distance from the occupant 9 to the virtual image 10 (hereinafter, referred to as image formation distance) L, can be set as appropriate, using the curvature of the concave mirror 7 included in the HUD 4, a relative position of the liquid crystal display 6 to the concave mirror 7, etc. For example, when the concave mirror 7 has a fixed curvature, the image formation distance L is determined by a distance (optical path length) along an optical path from a location at which video is displayed on the liquid crystal display 6 to the concave mirror 7. For example, the optical path length is set such that the image formation distance L is 2.5 m.

In addition, although in the present embodiment, as means for displaying images that are superimposed on a surrounding environment in front of the vehicle, the HUD 4 is used, other means may be used. For example, a windshield display (WSD) that displays video on the windshield 8 may be used. In the WSD, video may be displayed from a projector using the windshield 8 as a screen, or the windshield 8 may be used as a transmissive liquid crystal display. Images displayed on the windshield 8 by the WSD are, as with the HUD 4, images that are superimposed on a surrounding environment in front of the vehicle.

Furthermore, it is also possible to display a surrounding environment in front of the vehicle which is captured by a front camera 11 which will be described later, on a liquid crystal display in the vehicle, and display images that are superimposed on the displayed surrounding environment on the same liquid crystal display. In that case, too, the images displayed on the liquid crystal display are, as with the HUD 4, images that are superimposed on the surrounding environment in front of the vehicle.

In addition, the front camera 11 is installed on top of a front bumper of the vehicle, on the backside of a rearview mirror, etc. The front camera 11 is, for example, an imaging device having a camera that uses a solid-state imaging device such as a CCD, and is installed such that an optical-axis direction is directed toward the front in a traveling direction of the vehicle. Then, by performing image processing on a captured image which is captured by the front camera 11, conditions of a front environment (i.e., an environment on which the virtual image 10 is superimposed) which is visually identified by the occupant 9 through the windshield 8, etc., are detected. Note that instead of the front camera 11, a sensor such as millimeter-wave radar may be used.

In addition, an in-vehicle camera 12 is installed on an upper surface of an instrument panel of the vehicle. The in-vehicle camera 12 is, for example, an imaging device having a camera that uses a solid-state imaging device such as a CCD, and is installed such that an optical-axis direction is directed toward the driver's seat. Then, a face of the occupant 9 sitting in the driver's seat is captured. Then, by performing image processing on a captured image which is captured by the in-vehicle camera 12, a location of eyes (a start point of the line of sight) of the occupant 9 and a line-of-sight direction are detected.

Figure 2:
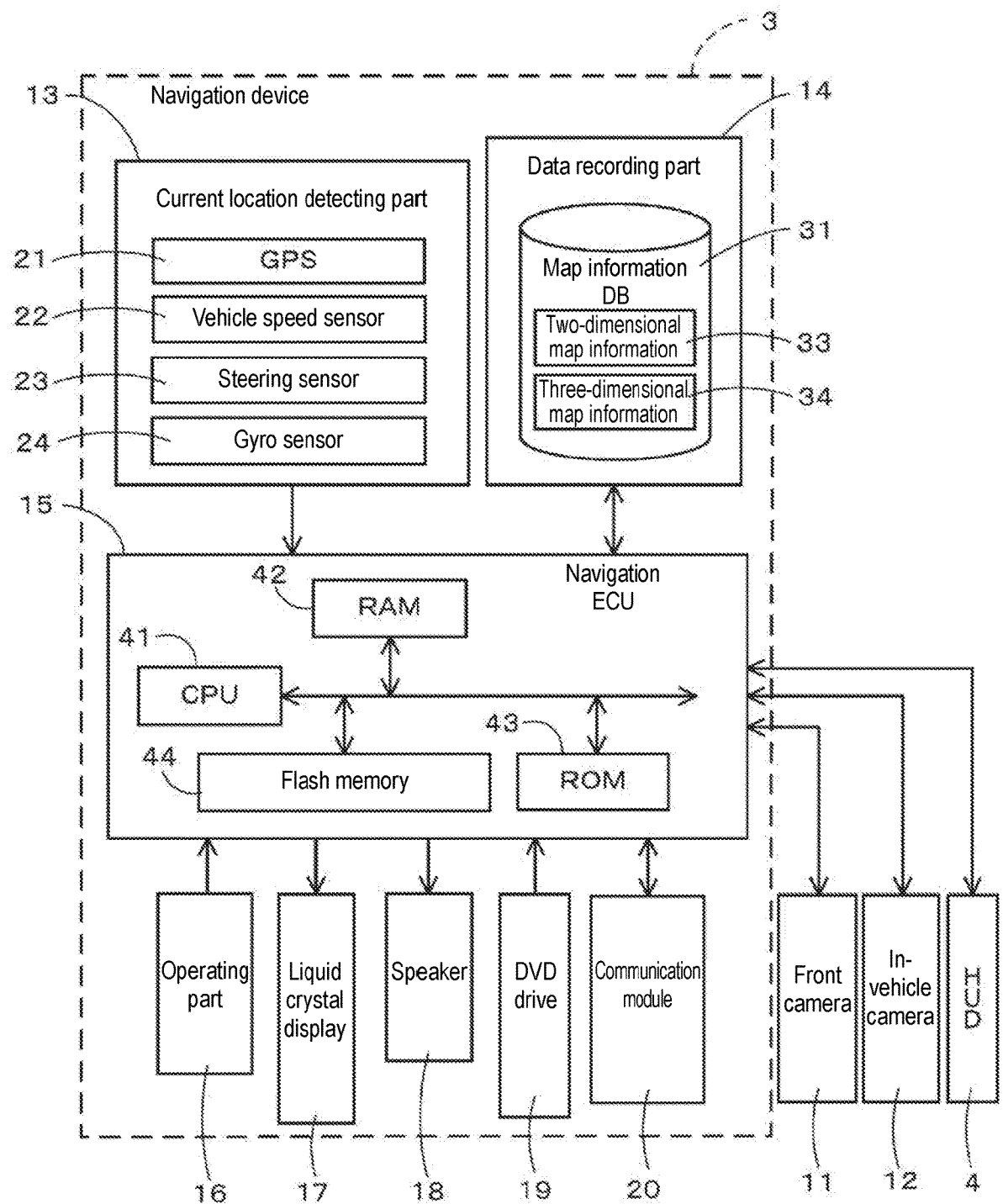
FIG. 2 is a block diagram showing a navigation device according to the present embodiment.

Next, a schematic configuration of the navigation device 3 included in the above-described superimposed-image display device 1 will be described using FIG. 2. FIG. 2 is a block diagram showing the navigation device 3 according to the present embodiment.

As shown in FIG. 2, the navigation device 3 according to the present embodiment includes a current location detecting part 13 that detects a current location of the vehicle 2 having the navigation device 3 mounted thereon; a data recording part 14 having various types of data recorded therein; a navigation ECU 15 that performs various types of arithmetic processing, based on inputted information; an operating part 16 that accepts operations from a user; a liquid crystal display 17 that displays a map of an area around the vehicle and facility information about facilities to the user; a speaker 18 that outputs audio guidance about route guidance; a DVD drive 19 that reads a DVD which is a recording medium; and a communication module 20 that performs communication with an information center such as a VICS (registered trademark: Vehicle Information and Communication System) center. (As used herein, the term "recording medium" does not encompass transitory signals.) In addition, the above-described HUD 4, front camera 11, in-vehicle camera 12, and the like, are connected to the navigation device 3 through an in-vehicle network such as CAN.

Each component included in the navigation device 3 will be described in turn below.

The current location detecting part 13 includes a GPS 21, a vehicle speed sensor 22, a steering sensor 23, a gyro sensor 24, etc., and can detect the current location and orientation of the vehicle, vehicle travel speed, the current time, etc. Here, particularly, the vehicle speed sensor 22 is a sensor for detecting the movement distance and vehicle speed of the vehicle, and generates pulses based on the rotation of drive wheels of the vehicle and outputs a pulse signal to the navigation ECU 15. Then, the navigation ECU 15 counts the generated pulses and thereby calculates the rotational speed and movement distance of the drive wheels. Note that the navigation device 3 does not need to include all of the above-described four types of sensors, and the navigation device 3 may be configured to include only one or a plurality of types of sensors among those sensors.

In addition, the data recording part 14 includes a hard disk (not shown) serving as an external storage device and a storage medium; and a recording head (not shown) which is a driver for reading a map information DB 31, a predetermined program, etc., recorded on the hard disk, and writing predetermined data to the hard disk. Note that the data recording part 14 may include a flash memory, a memory card, or an optical disc such as a CD or a DVD, instead of the hard disk. Note also that the configuration may be such that the map information DB 31 is stored on an external server and the navigation device 3 obtains the map information DB 31 by communication.

Here, the map information DB 31 stores each of two-dimensional map information 33 and three-dimensional map information 34. The two-dimensional map information 33 is map information used in the general navigation device 3, and includes, for example, link data about roads (links), node data about node points, facility data about facilities, search data used for a route search process, map display data for displaying maps, intersection data about each intersection, and retrieval data for retrieving points.

On the other hand, the three-dimensional map information 34 includes not only information on a plane but also a height, and is map information for three-dimensionally representing a map. Particularly, in the present embodiment, the three-dimensional map information 34 is map information for three-dimensionally representing the outlines of roads, the shapes of constructions, the section lines of roads, traffic lights, road signs, signs, etc. Note that the three-dimensional map information 34 may also include information other than the above-described outlines of roads, shapes of constructions, section lines of roads, traffic lights, road signs, and signs. For example, information for three-dimensionally representing roadside trees, road surface markings, etc., may also be included. Particularly, in the present embodiment, information for identifying the locations of light sources (e.g., streetlights disposed around roads and signs that emit light) present on a map is also included. In addition, as the three-dimensional map information 34, a map itself may be stored in which objects such as the above-described outlines of roads, shapes of constructions, section lines of roads, traffic lights, road signs, and signs are disposed in three-dimensional space, or information required to three-dimensionally represent a map (three-dimensional coordinate data of the outlines of roads, the shapes of constructions, the section lines of roads, traffic lights, road signs, signs, etc.) may be stored. When information required to three-dimensionally represent a map is stored, the navigation device 3 creates a map that three-dimensionally represents a target area at necessary timing, using information that is stored as three-dimensional map information 34.

Then, the navigation device 3 performs general functions such as displaying a map image on the liquid crystal display 17 and searching for a guided route, using the two-dimensional map information 33. In addition, as will be described later, a process related to display of a guidance image is performed using also the three-dimensional map information 34, in addition to the two-dimensional map information 33.

Meanwhile, the navigation ECU (Electronic Control Unit) 15 is an electronic control unit that performs overall control of the navigation device 3, and includes a CPU 41 serving as a computing device and a control device, and internal storage devices such as a RAM 42 that is used as a working memory when the CPU 41 performs various types of arithmetic processing, and that stores route data obtained when a route is searched for, etc., a ROM 43 having recorded therein a travel assistance processing program (FIG. 3) which will be described later, etc., in addition to a program for control, and a flash memory 44 that stores a program read from the ROM 43. Note that the navigation ECU 15 includes various types of means which are processing algorithms. For example, captured-image obtaining means obtains a captured image which is obtained by capturing a surrounding environment in front of the vehicle driver's line of sight. Map information obtaining means obtains three-dimensional map information 34. Light source location obtaining means obtains the location of a light source. Checking means checks the captured image against the three-dimensional map information 34. Image disposing means disposes guidance images and the light source in the three-dimensional map information 34, based on a results of the checking by the checking means. Visual identification mode obtaining means obtains visual identification modes of the guidance images used when the guidance images are visually identified from a vehicle location in the three-dimensional map information.

The operating part 16 is operated, for example, upon inputting a point of departure which is a travel start point and a destination which is a travel end point, and includes a plurality of operating switches such as various types of keys and buttons (not shown). Based on a switch signal outputted by, for example, depression of each switch, the navigation ECU 15 performs control to perform corresponding various types of operation. Note that the operating part 16 may include a touch panel provided on the front of the liquid crystal display 17. Note also that the operating part 16 may include a microphone and an audio recognition device.

In addition, on the liquid crystal display 17 there are displayed a map image including roads, traffic information, operation guidance, an operation menu, guidance on keys, a guided route from a point of departure to a destination, guidance information provided along the guided route, news, weather forecasts, time, e-mails, TV programs, etc. Note that in the present embodiment, since the HUD 4 is provided as information displaying means, when the HUD 4 is configured to display the above-described map image, etc., the liquid crystal display 17 may be omitted.

In addition, the speaker 18 outputs audio guidance that provides guidance on traveling along a guided route and guidance on traffic information, based on instructions from the navigation ECU 15.

In addition, the DVD drive 19 is a drive that can read data recorded on recording media such as DVDs and CDs. Then, based on the read data, for example, music or video is played back or the map information DB 31 is updated. Note that a card slot for performing reading and writing on a memory card may be provided instead of the DVD drive 19.

In addition, the communication module 20 is a communication device for receiving traffic information including various information such as traffic congestion information, regulation information, and traffic accident information which are transmitted from a traffic information center, e.g., a VICS center or a probe center, and corresponds to, for example, a mobile phone or a DCM.

Figure 3:
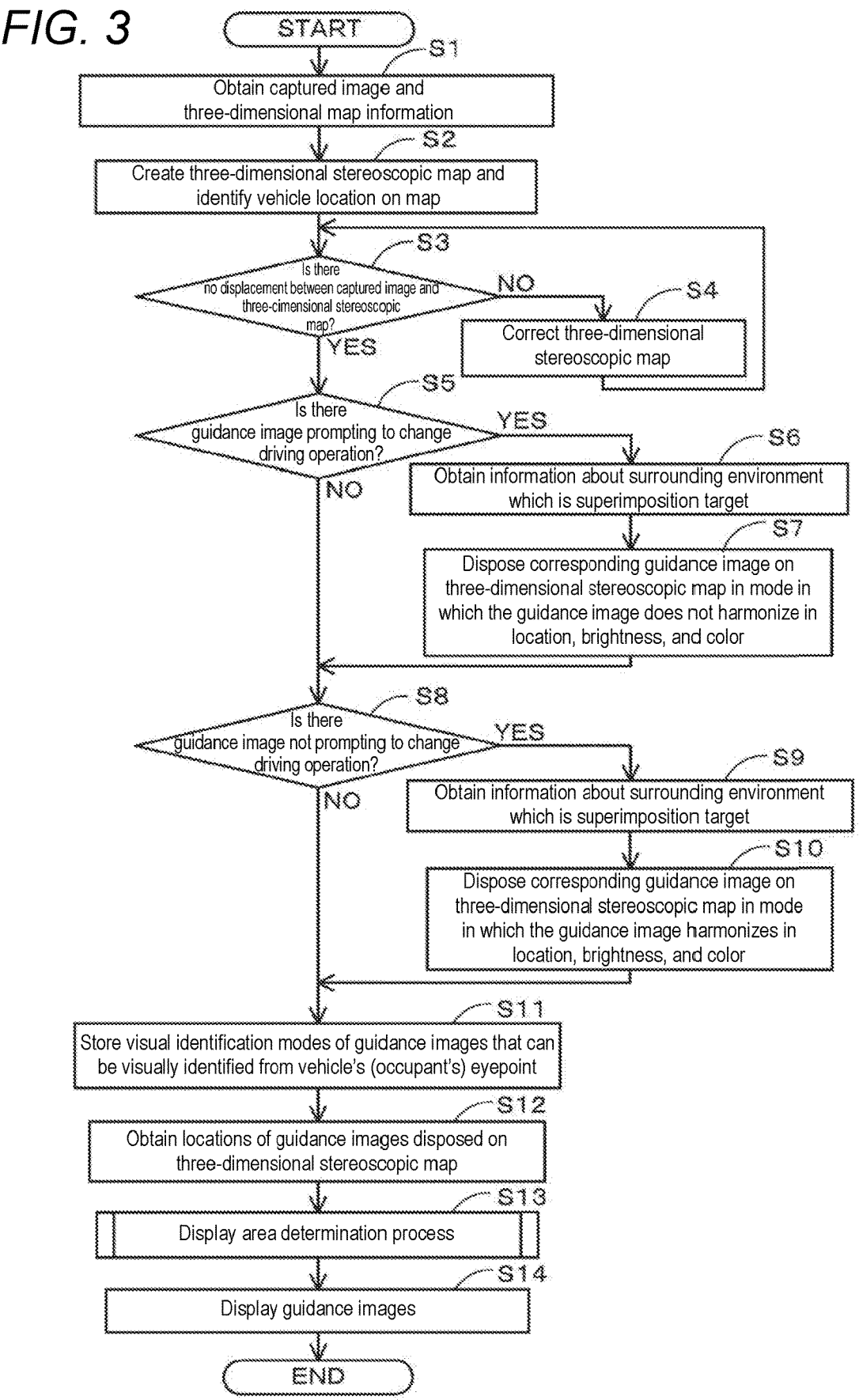
FIG. 3 is a flowchart of a travel assistance processing program according to the present embodiment.

Next, a travel assistance processing program executed by, particularly, the navigation device 3 in the superimposed-image display device 1 having the above-described configuration will be described based on FIG. 3. FIG. 3 is a flowchart of a travel assistance processing program according to the present embodiment. Here, the travel assistance processing program is a program that is executed after a vehicle's accessory power supply (ACC power supply) is turned on, and that provides the occupant 9 of the vehicle 2 with various types of information such as guidance on a vehicle's traveling direction along a guided route, using the HUD 4. Note that the program represented as a flowchart in the following FIG. 3 is stored in the RAM 42 or the ROM 43 included in the navigation device 3, and is executed by the CPU 41.

First, in the travel assistance processing program, at step (hereinafter, abbreviated as S) 1, the CPU 41 obtains a captured image which is obtained by the front camera 11 capturing a surrounding environment (view) in front of the vehicle. Furthermore, the CPU 41 reads three-dimensional map information 34 for an area around a current vehicle location from the map information DB 31. Note that the three-dimensional map information 34 stores information required to three-dimensionally represent a map (three-dimensional coordinate data of the outlines of roads, the shapes of constructions, the section lines of roads, traffic lights, road signs, signs, etc.).

Then, at S2, the CPU 41 creates a three-dimensional stereoscopic map representing an area around the current vehicle location (a map that three-dimensionally represents buildings, roads, etc.), based on the three-dimensional map information 34 read at the above-described S1. Specifically, by performing the following process, a three-dimensional stereoscopic map is created.

First, the CPU 41 obtains objects (shape data) that model roads, constructions, road signs, signs, etc., in three-dimensional space, from the three-dimensional map information 34. Note that the CPU 41 may be configured to obtain corresponding objects among objects that are modeled in advance and stored in a DB, or may be configured to newly create objects by performing modeling at S2. When modeling is performed, information that identifies the shapes and locations of roads and structures (constructions, road signs, signs, etc.) present around the roads is obtained from the three-dimensional map information 34, and a modeling process is performed based on the obtained information.

Here, the modeling is a process of creating the shapes of models (objects) in three-dimensional space, and more specifically, determination of the coordinates of each vertex, determination of parameters of equations that represent boundaries and surfaces, etc., are performed. Note that the modeling is a publicly known technique and thus details thereof are omitted. Then, the modeled objects (shape data) are represented in the form of a "wireframe model" that displays only sides, a "surface model" that displays surfaces, etc., depending on the application. Then, the three-dimensional space in which each object is formed serves as a three-dimensional stereoscopic map.

In addition, at the above-described S2, the CPU 41 also identifies the current location and orientation of the vehicle in the created three-dimensional stereoscopic map, based on parameters detected by the current location detecting part 13. Note that to facilitate a process of checking the three-dimensional stereoscopic map against the captured image which will be described later, it is desirable that the current location of the vehicle be particularly an installation location of the front camera 11 installed on the vehicle, and the orientation of the vehicle be an optical-axis direction of the front camera 11.

Figure 4:
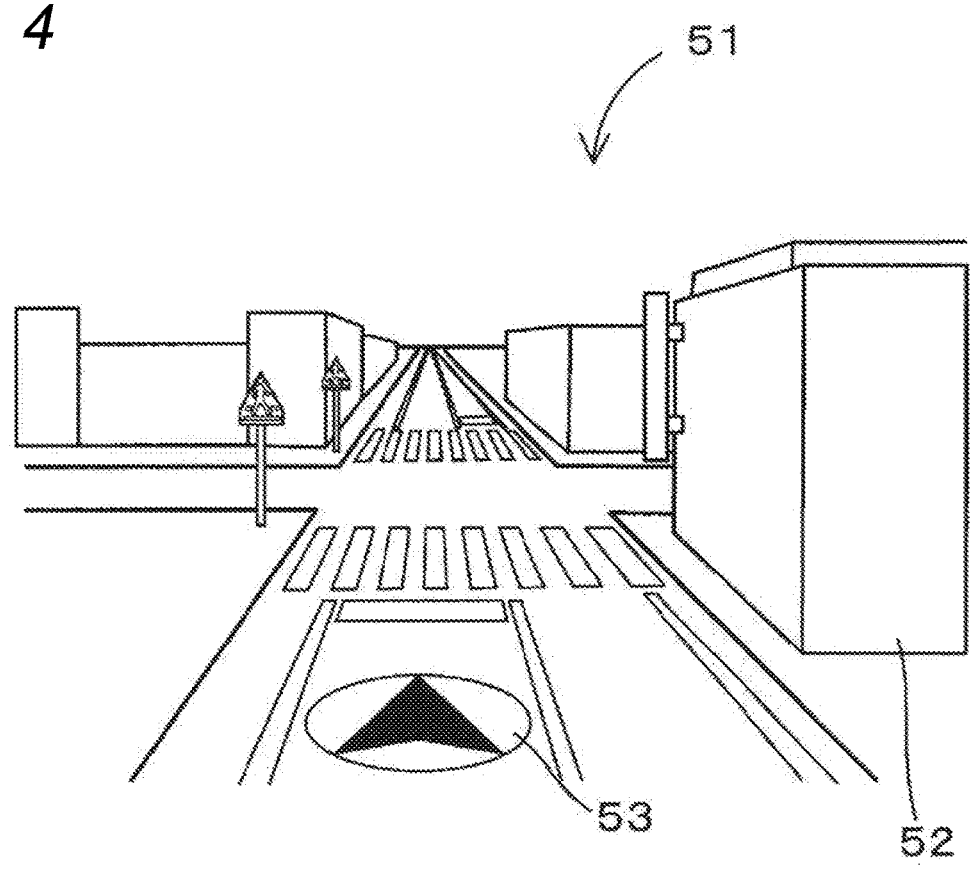
FIG. 4 is a diagram showing a three-dimensional stereoscopic map created based on three-dimensional map information.

Here, FIG. 4 is a diagram showing an example of a three-dimensional stereoscopic map 51 created at the above-described S3. As shown in FIG. 4, on the three-dimensional stereoscopic map 51 there are disposed objects 52 representing roads and structures (constructions, road signs, signs, etc.) in three-dimensional space. Particularly, objects 52 representing roads and structures present around the current vehicle location are disposed. In addition, a vehicle location mark 53 representing the current location and orientation of the vehicle is also disposed on the three-dimensional stereoscopic map 51.

Subsequently, at S3, the CPU 41 checks the captured image obtained at the above-described S1 against the three-dimensional stereoscopic map created at the above-described S2, and thereby determines whether there is no displacement between the captured image and the three-dimensional stereoscopic map. Specifically, the CPU 41 sets the current location of the vehicle set on the three-dimensional stereoscopic map (more specifically, the installation location of the front camera 11 and height is also considered) as an eyepoint, and sets the orientation of the vehicle as a line-of-sight direction, and checks an image obtained when the three-dimensional stereoscopic map is visually identified using the set eyepoint and line-of-sight direction against the captured image. Note that since the three-dimensional stereoscopic map does not include moving objects such as pedestrians and other vehicles and some fixed objects such as trees, the determination is made basically ignoring displacement caused thereby. Note also that it is desirable to consider that there is no displacement not only when the captured image and the three-dimensional stereoscopic map completely match each other, but also when there is some level of displacement within an allowable range.

Then, if it is determined that there is no displacement between the captured image obtained at the above-described S1 and the three-dimensional stereoscopic map created at the above-described S2 (S3: YES), processing transitions to S5. On the other hand, if it is determined that there is displacement between the captured image obtained at the above-described S1 and the three-dimensional stereoscopic map created at the above-described S2 (S3: NO), processing transitions to S4.

At S4, the CPU 41 corrects the current location and orientation of the vehicle set on the three-dimensional stereoscopic map, so as to reduce the displacement between the three-dimensional stereoscopic map created at the above-described S2 and the captured image obtained at the above-described S1. Note that an object side may be corrected, with the current location and orientation of the vehicle on the three-dimensional stereoscopic map being fixed. By that, it becomes possible to identify the correct current location and orientation of the vehicle (more specifically, the installation location and optical-axis direction of the front camera 11) on the three-dimensional stereoscopic map. Thereafter, processing returns to S3.

On the other hand, at S5, the CPU 41 determines whether to display, by the HUD 4, particularly, a guidance image that prompts to change driving operation, as a guidance image for providing vehicle travel assistance, based on the current vehicle and surrounding states. Here, in the present embodiment, guidance images which are display targets of the HUD 4 include (1) a guidance image that prompts the driver to change driving operation (hereinafter, referred to as first guidance image); and (2) a guidance image that does not prompt the driver to change driving operation (hereinafter, referred to as second guidance image).

(1) The first guidance image is a guidance image that allows the driver to change driving operation (e.g., change the steering angle or change the amount of stepping on an accelerator or a brake) by the driver visually identifying the guidance image. The first guidance image corresponds, for example, to an image of an arrow that provides guidance on a traveling direction of a traveling road on which the vehicle travels after exiting a guidance divergence point, and an image for a warning against a warning object such as a pedestrian.

On the other hand, (2) the second guidance image is a guidance image that basically does not allow the driver to change driving operation (e.g., change the steering angle or change the amount of stepping on the accelerator or the brake) even when the driver visually identifies the guidance image. The second guidance image corresponds, for example, to an image of a mark representing a future travel route of the vehicle along a guided route, and an image that provides guidance on a facility present around the vehicle.

Therefore, at the above-described S5, for example, when the vehicle is located within a predetermined distance from a guidance divergence point or when there is a warning object which is a warning target around the vehicle, it is determined that a first guidance image that prompts to change driving operation is displayed by the HUD 4.

Then, if it is determined to display, by the HUD 4, particularly, a first guidance image that prompts to change driving operation, as a guidance image for providing vehicle travel assistance (S5: YES), processing transitions to S6. On the other hand, if it is determined not to display, by the HUD 4, a first guidance image that prompts to change driving operation, as a guidance image for providing vehicle travel assistance (S5: NO), processing transitions to S8.

First, at S6, the CPU 41 obtains particularly the "location", "brightness", and "color" of a region on which the first guidance image is superimposed, as information about a surrounding environment on which the first guidance image is to be superimposed. For example, when the first guidance image is displayed so as to be superimposed on a road surface, the location (three-dimensional location coordinates) of the road surface on which the first guidance image is superimposed, the brightness (luminance and lightness) of the road surface, and the color (RGB value) of the road surface (also including things, such as section lines, disposed on the road surface) are obtained. On the other hand, when the first guidance image is displayed so as to be superimposed on a wall surface of a construction, the location (three-dimensional location coordinates) of the wall surface on which the first guidance image is superimposed, the brightness (luminance and illuminance) of the wall surface, and the color (RGB value) of the wall surface are obtained. Note that the "location" of the above-described surrounding environment is identified based on the three-dimensional map information 34, and the "brightness" and "color" are identified based on the captured image which is captured by the front camera 11.

Then, at S7, the CPU 41 disposes the first guidance image which is a display target on the three-dimensional stereoscopic map created at the above-described S2. Here, the first guidance image is disposed in a mode in which the first guidance image does not harmonize in "location", "brightness", and "color" with the surrounding environment which is a superimposition target, compared to a second guidance image which will be described later.

For example, when the first guidance image is an image of an arrow that provides guidance on a traveling direction of a traveling road on which the vehicle travels after exiting a guidance divergence point, the guidance image is disposed so as to stand in a vertical direction at a location distanced a predetermined distance (e.g., 1 m) upward from a road surface of the traveling road on which the vehicle travels after exiting the guidance divergence point (e.g., when a left turn is made at the guidance divergence point, a road connected to a left side of the guidance divergence point). Namely, by disposing the first guidance image such that the first guidance image is distanced from the road surface, the "location" is prevented from harmonizing with the location of the road surface which is a superimposition target.

In addition, the first guidance image to be disposed is displayed in a different display color and brightness than the color and brightness of the surrounding environment which is a superimposition target. For example, when the superimposition target for the first guidance image is a road surface, the RGB value and luminance of the first guidance image are set to values greatly different from those of the road surface (also including things, such as section lines, disposed on the road surface) on which the first guidance image is superimposed. Specifically, for example, a method is used in which the first guidance image is displayed using a color with an RGB value whose numerical value difference from that of the color of the road surface is greater than or equal to a predetermined value (e.g., 50 or more), or a color opposite the color of the road surface (e.g., when the road surface is blue, the first guidance image is yellow), and is displayed such that the luminance is higher or lower by a predetermined value than that of the road surface. By that, the "brightness" and "color" are prevented from harmonizing with the brightness and color of the road surface which is a superimposition target.

Figure 5:
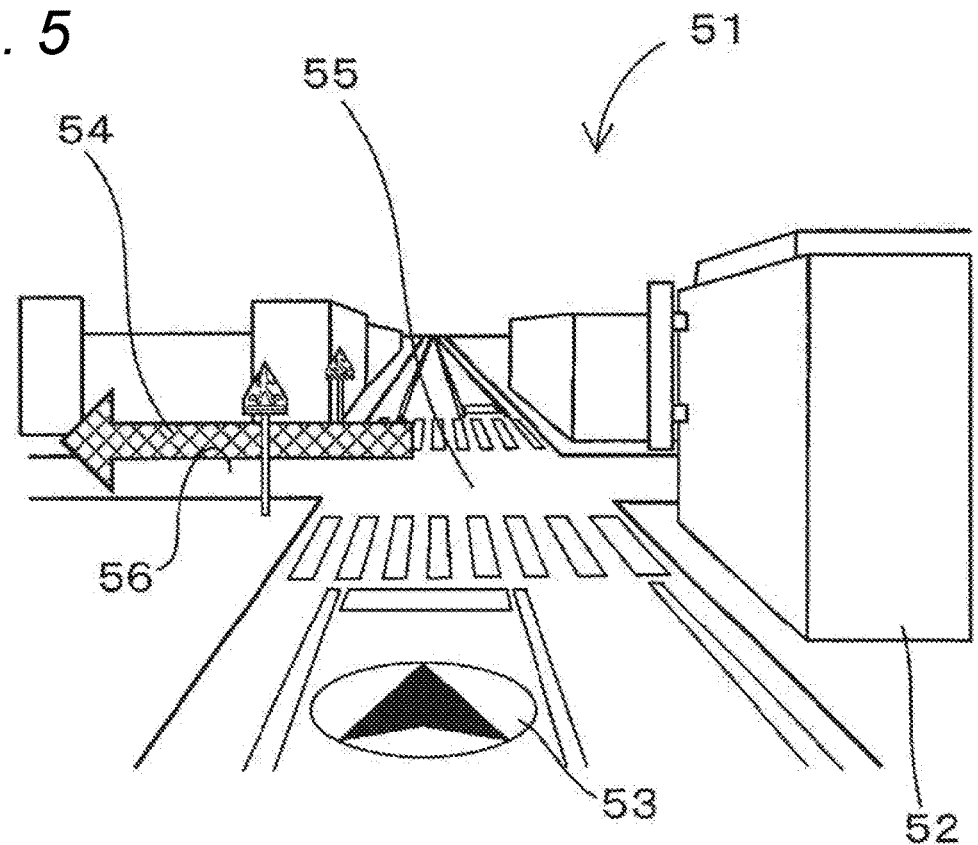
FIG. 5 is a diagram showing a three-dimensional stereoscopic map obtained after disposing a first guidance image.

Here, FIG. 5 is a diagram in which a first guidance image 54 is disposed on the three-dimensional stereoscopic map 51. As shown in FIG. 5, the first guidance image 54 is an image of an arrow that provides the vehicle with guidance on traveling a road connected to a left side after exiting a guidance divergence point 55, and is disposed so as to stand in a vertical direction at a location distanced a predetermined distance (e.g., 1 m) upward from a road surface 56 of the road connected to the left side of the guidance divergence point 55. In addition, the first guidance image 54 is displayed in a different display color and brightness than the color and brightness of the road surface 56.

Thereafter, at S8, the CPU 41 determines whether to display, by the HUD 4, particularly, a second guidance image that does not prompt to change driving operation, as a guidance image for providing vehicle travel assistance, based on the current vehicle and surrounding states.

Note that the second guidance image is, as described above, a guidance image that basically does not allow the driver to change driving operation (e.g., change the steering angle or change the amount of stepping on the accelerator or the brake) even when the driver visually identifies the guidance image. The second guidance image corresponds, for example, to an image of a mark representing a future travel route of the vehicle along a guided route, and an image that provides guidance on a facility present around the vehicle. Therefore, at the above-described S8, for example, when a guided route is set on the navigation device 3 or when a facility which is a guidance target is present around the vehicle, it is determined to display, by the HUD 4, a second guidance image that does not prompt to change driving operation.

Then, if it is determined to display, by the HUD 4, particularly, a second guidance image that does not prompt to change driving operation, as a guidance image for providing vehicle travel assistance (S8: YES), processing transitions to S9. On the other hand, if it is determined not to display, by the HUD 4, a second guidance image that does not prompt to change driving operation, as a guidance image for providing vehicle travel assistance (S8: NO), processing transitions to S11.

First, at S9, the CPU 41 obtains particularly the "location", "brightness" and "color" of a region on which the second guidance image is superimposed, as information about a surrounding environment on which the second guidance image is to be superimposed. Details are the same as those at the above-described S6 and thus description thereof is omitted. In addition, at the above-described S9, the locations of light sources that irradiate the surrounding environment with light are also obtained. The light sources include the sun, streetlights, signs that emit light, etc. Note that the location of the sun is identified from, for example, the current date and time. The locations of streetlights and signs that emit light are identified from the three-dimensional map information 34.

Then, at S10, the CPU 41 disposes the second guidance image which is a display target on the three-dimensional stereoscopic map created at the above-described S2. Here, the second guidance image is disposed in a mode in which the second guidance image harmonizes in "location", "brightness", and "color" with the surrounding environment which is a superimposition target, compared to the aforementioned first guidance image.

For example, when the second guidance image is an image of a mark representing a future travel route of the vehicle along a guided route, the guidance image is disposed so as to be superimposed on a road surface of a road on which the vehicle travels (so as to be located on the road surface). Namely, by disposing the second guidance image on the road surface, the "location" harmonizes with the location of the road surface which is a superimposition target.

In addition, the second guidance image to be disposed is displayed in the same or similar display color and brightness as/to the color and brightness of the surrounding environment which is a superimposition target. For example, when the superimposition target for the second guidance image is a road surface, the RGB value and luminance of the second guidance image are set to the same or similar values as/to those of the road surface (also including things, such as section lines, disposed on the road surface) on which the second guidance image is superimposed. Specifically, for example, a method is used in which the second guidance image is displayed using a color with an RGB value whose numerical value difference from that of the color of the road surface is less than a predetermined value (e.g., less than 50), or a color adjacent to or present within a predetermined angle from the color of the road surface on a color wheel (e.g., when the road surface is blue, the second guidance image is purple), and is displayed such that a difference in luminance from the road surface is within a predetermined value. The display color of the second guidance image can also be set to the same or similar color (e.g., milk-white or yellow) as/to that of a section line disposed on the road surface which is a superimposition target. By that, the "brightness" and "color" harmonize with the brightness and color of the road surface which is a superimposition target.

In addition, when the brightness of the second guidance image is identified, the CPU 41 disposes the second guidance image and also the light sources obtained at the above-described S9 on the three-dimensional stereoscopic map. Then, a mode of irradiation of light on the second guidance image from the light sources is identified on the three-dimensional stereoscopic map, and the brightness of the second guidance image is identified based on the identified mode of irradiation. Specifically, an area of the image that is irradiated with light from the light sources is made brighter than an area not irradiated with light.

Figure 6:
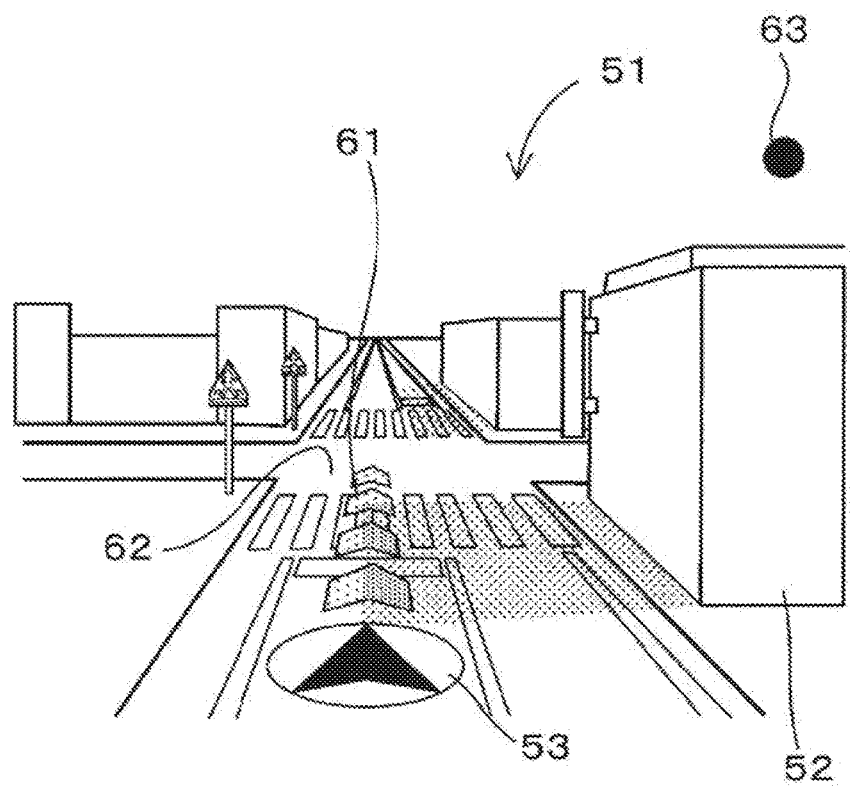
FIG. 6 is a diagram showing a three-dimensional stereoscopic map obtained after disposing a second guidance image and a light source.

Here, FIG. 6 is a diagram in which a second guidance image 61 is disposed on the three-dimensional stereoscopic map 51. As shown in FIG. 6, the second guidance image 61 is an image of a mark representing a future travel route of the vehicle along a guided route, and is parallelly disposed on a road surface 62 of a road on which the vehicle travels. In addition, the second guidance image 61 is displayed in the same or similar display color and brightness as/to the color and brightness of the road surface 62. Furthermore, an area of the second guidance image 61 that is irradiated with light from a light source (e.g., the sun) 63 disposed on the three-dimensional stereoscopic map 51 is displayed so as to be brighter than an area not irradiated with light. In an example shown in FIG. 6, an area shadowed by a building located on the right side of the vehicle is displayed so as to be darker than other areas.

Then, at S11, the CPU 41 first obtains an image (hereinafter, referred to as visually-identified image) which is obtained by visually identifying the three-dimensional stereoscopic map having the first guidance image and the second guidance image disposed thereon, in a vehicle's traveling direction from a vehicle's (occupant's) eyepoint. Particularly, the vehicle's eyepoint is a vehicle occupant's eye location. Note that the occupant's eye location can be detected by the in-vehicle camera 12, and by combining the current location and orientation of the vehicle which are identified finally as a result of checking the captured image against the three-dimensional stereoscopic map at the above-described S3 with a result of the detection by the in-vehicle camera 12, the occupant's eye location on the three-dimensional stereoscopic map is identified. The visually-identified image is an image that can be visually identified when objects (roads, constructions, road signs, signs, the first guidance image, the second guidance image, etc.) disposed on the three-dimensional stereoscopic map are visually identified in the vehicle's traveling direction from the vehicle's (occupant's) eyepoint, and corresponds to the vehicle occupant's field of vision. Note that the visually-identified image does not necessarily need to be an image visually identified in the vehicle's traveling direction as long as the visually-identified image is an image visually identified from the vehicle's (occupant's) eyepoint. Note, however, that the visually-identified image needs to include at least the first guidance image and the second guidance image.

Figure 7:
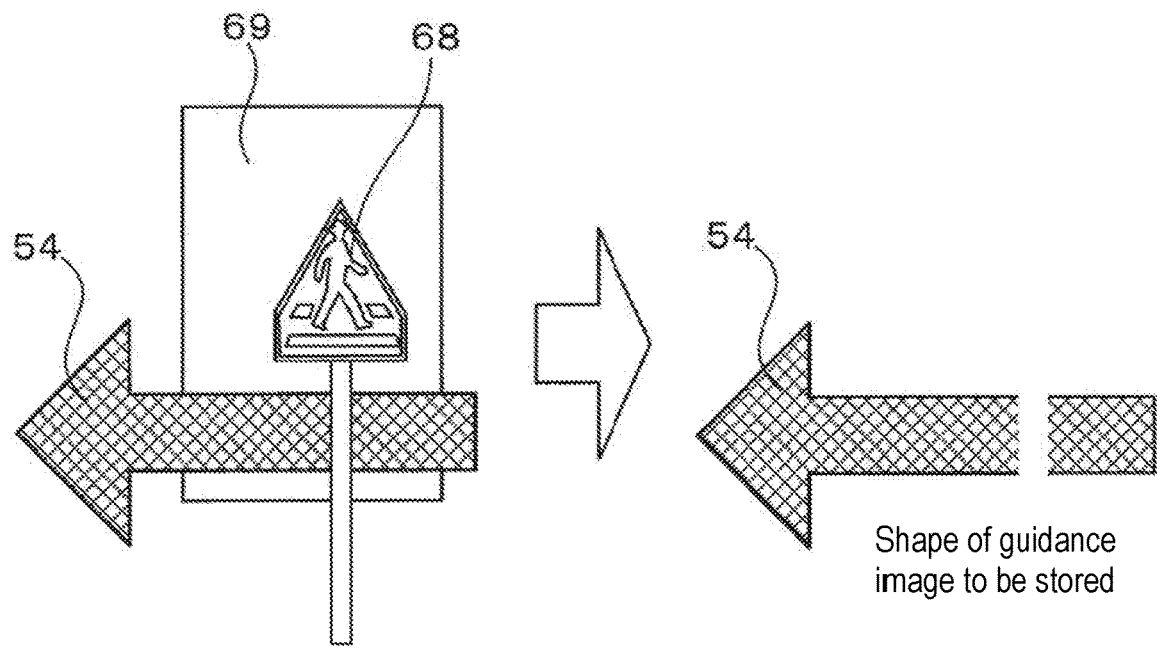
FIG. 7 is a diagram describing a method of creating the first guidance image and the second guidance image which are displayed on a HUD.

Subsequently, at the above-described S11, the CPU 41 stores visual identification modes (color, brightness, and shape) of the first guidance image and second guidance image included in the visually-identified image, as display modes of the first guidance image and the second guidance image which are display targets of the HUD 4. Note that the colors, brightness, and shapes of the first guidance image and second guidance image included in the visually-identified image are the colors, brightness, and shapes of the first guidance image and the second guidance image that can be visually identified when the objects (roads, constructions, road signs, signs, the first guidance image, the second guidance image, etc.) disposed on the three-dimensional stereoscopic map are visually identified from the vehicle's (occupant's) eyepoint. Here, when, as shown in FIG. 7, the first guidance image 54 and the second guidance image 61 are visually identified overlapping each object 68 (e.g., a road sign or a construction) located on a front side thereof, the shapes of the first guidance image and the second guidance image which are stored at the above-described S11 are shapes in which an overlapping portion is eliminated. On the other hand, when the first guidance image 54 and the second guidance image 61 are visually identified overlapping each object 69 located on a back side thereof, the shapes of the first guidance image and the second guidance image which are stored at the above-described S11 are shapes including also an overlapping portion.

Furthermore, at S12, the CPU 41 obtains locations of the first guidance image and second guidance image disposed on the three-dimensional stereoscopic map.

Thereafter, at S13, the CPU 41 performs a display area determination process (FIG. 9) which will be described later. In the display area determination process, areas of the HUD 4 in which the first guidance image and the second guidance image are displayed (areas of the windshield 8 onto which the first guidance image and the second guidance image are projected, or areas of the liquid crystal display 6 of the HUD 4 in which the guidance images are displayed) are determined.

Subsequently, at S14, the CPU 41 transmits a control signal to the HUD 4 and displays the first guidance image and the second guidance image that have the colors, brightness, and shapes stored at the above-described S11, on the display areas determined at the above-described S13 of the liquid crystal display 6 of the HUD 4. As a result, virtual images of the first guidance image and the second guidance image which are superimposed on a view in front of the vehicle are visually identified by the vehicle occupant.

Figure 8:
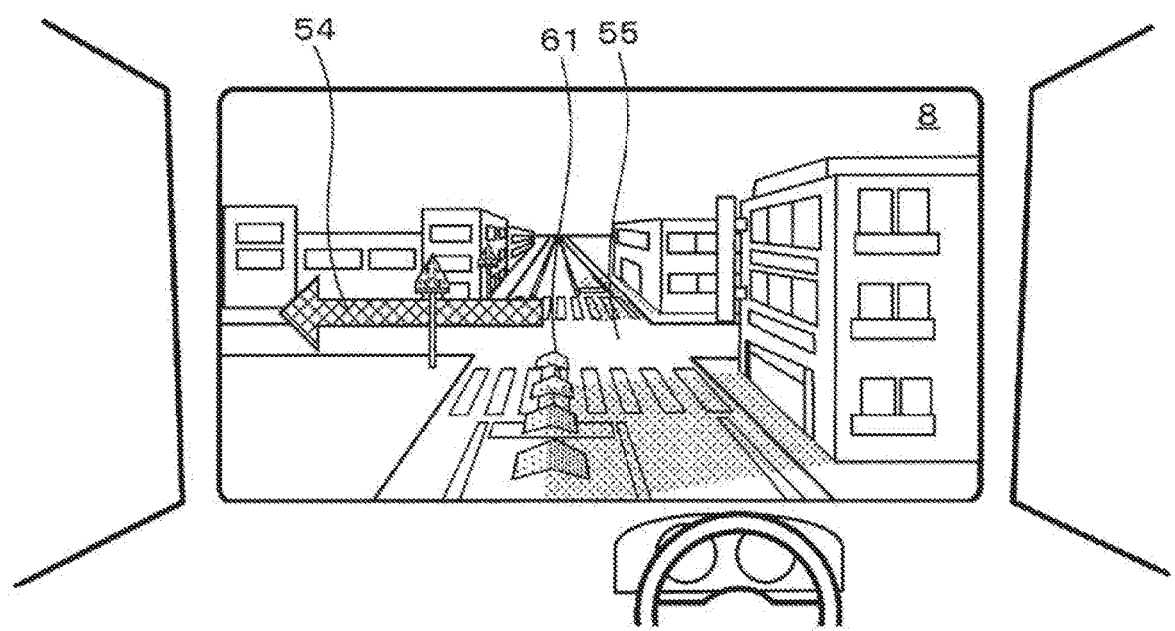
FIG. 8 is a diagram showing an example of virtual images of the first guidance image and the second guidance image which are visually identified by a vehicle occupant.

Here, FIG. 8 is a diagram showing virtual images of a first guidance image and a second guidance image which are visually identified by the vehicle occupant particularly when a traveling direction of a traveling road on which the vehicle travels after exiting a guidance divergence point is a left direction (i.e., a left turn).

As shown in FIG. 8, the first guidance image 54 of an arrow that indicates traveling in the left direction is displayed as a virtual image through the windshield 8 of the vehicle, such that the first guidance image 54 is superimposed at a location distanced upward from a road surface of the traveling road on which the vehicle travels after making a left turn at the guidance divergence point 55. Furthermore, the second guidance image 61 of a mark representing a future travel route of the vehicle along a guided route is displayed as a virtual image, such that the second guidance image 61 is superimposed on a road surface of a road on which the vehicle travels. In addition, the first guidance image 54 is displayed in a different color and brightness than the road surface which is a superimposition target. Therefore, it becomes possible for the vehicle occupant to distinguish the virtual image of the first guidance image 54 from a surrounding view and clearly, visually identify the virtual image of the first guidance image 54. On the other hand, the second guidance image 61 is displayed in the same or similar color and brightness as/to those of the road surface which is a superimposition target. Therefore, the vehicle occupant visually identifies the virtual image of the second guidance image 61 which harmonizes with the surrounding view, and thus, the driver does not feel annoyed.

Note that although in an example shown in FIG. 8 both the virtual image of the first guidance image 54 and the virtual image of the second guidance image 61 are simultaneously displayed, depending on the state of the vehicle, there is a state in which only the virtual image of the first guidance image 54 is displayed or there is a state in which only the virtual image of the second guidance image 61 is displayed.

Figure 9:
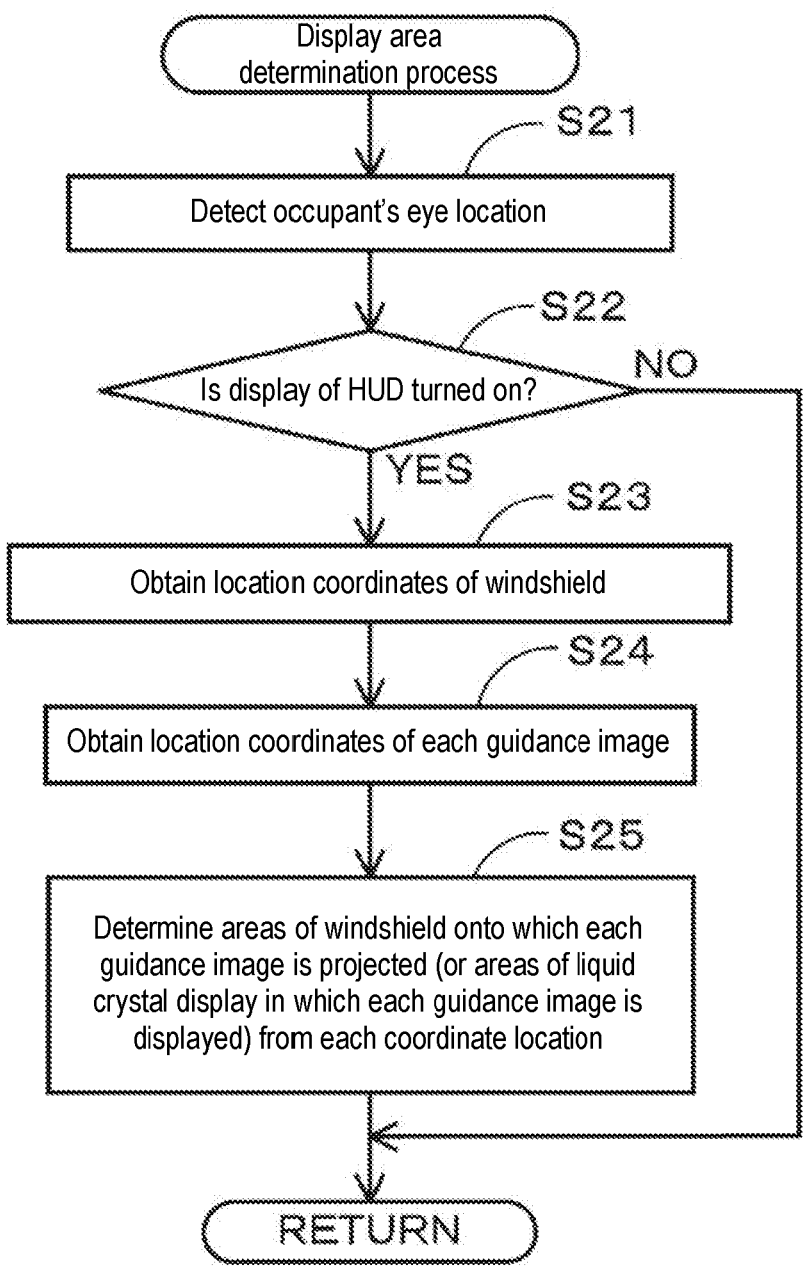
FIG. 9 is a flowchart of a subprocess program of a display area determination process.

Next, a subprocess of the display area determination process performed at the above-described S13 will be described based on FIG. 9. FIG. 9 is a flowchart of a subprocess program of the display area determination process.

First, at S21, the CPU 41 detects a vehicle occupant's eye location, based on a captured image which is captured by the in-vehicle camera 12. Note that the detected eye location is identified as three-dimensional location coordinates.

Then, at S22, the CPU 41 determines whether display of the HUD 4 is turned on. Note that on-off switching of display of the HUD 4 can be performed by vehicle occupant's operations. Note also that on-off switching may be automatically performed based on surrounding conditions or a vehicle's state.

Then, if it is determined that display of HUD 4 is turned on (S22: YES), processing transitions to S23. On the other hand, if it is determined that display of HUD 4 is turned off (S22: NO), the process ends without displaying virtual images of the first guidance image and the second guidance image by the HUD 4.

At S23, the CPU 41 obtains location coordinates of the windshield 8 onto which images are to be projected by the HUD 4. Note that the location coordinates of the windshield 8 are identified as three-dimensional location coordinates.

Then, at S24, the CPU 41 obtains coordinates that identify the locations of the first guidance image and second guidance image disposed on the three-dimensional stereoscopic map which are obtained at the above-described S12, as the location coordinates of the first guidance image and the second guidance image. Note that the location coordinates of the first guidance image and the second guidance image are likewise identified as three-dimensional location coordinates.

Subsequently, at S25, the CPU 41 determines areas of the windshield 8 onto which the first guidance image and the second guidance image are projected, based on the location coordinates obtained at the above-described S21, S23, and S24. Furthermore, areas of the liquid crystal display 6 in the HUD 4 in which the first guidance image and the second guidance image are displayed are also determined from the determined projection areas. Thereafter, processing transitions to S14, and display of virtual images using the HUD 4 is performed based on the determined projection areas and display areas. Note that the processes at S11 to S14 are repeatedly performed until display of the HUD is turned off.

As described above in detail, according to a superimposed-image display device and a computer program executed on the superimposed-image display device according to the present embodiment, when a first guidance image that prompts a driver to change driving operation and a second guidance image that does not prompt the driver to change driving operation are superimposed on a surrounding environment in front of a vehicle so as to be visually identified, the second guidance image is displayed in a display mode in which the second guidance image more harmonizes in at least one of a location, brightness, and color with the surrounding environment which is a superimposition target than the first guidance image (S5 to S14), and thus, even when multiple guidance images are displayed, it becomes possible to allow the driver to more clearly, visually identify the first guidance image that should be visually identified upon performing a driving operation. On the other hand, it becomes possible to prevent the driver from feeling annoyed by the second guidance image which is less necessary to be visually identified upon performing a driving operation.

Note that the above-described embodiment is not limiting, and it is, of course, possible to make various modifications and changes without departing from the broad spirit and scope of the inventive principles.

For example, although in the above-described present embodiment the configuration is such that virtual images are created in front of the windshield 8 of the vehicle 2 by the HUD 4, the configuration may be such that virtual images are created in front of a window other than the windshield 8. In addition, a target on which video is reflected by the HUD 4 may be a visor (combiner) installed around the windshield 8 instead of the windshield 8 itself.

In addition, although in the present embodiment the HUD 4 is used as means for displaying images that are superimposed on a surrounding environment, a windshield display (WSD) that displays images on the windshield 8 may be used. Alternatively, a display device that superimposes guidance images on a real view which is displayed on the liquid crystal display 17 of the navigation device 3 may be used.

In addition, although in the present embodiment a second guidance image is displayed in a display mode in which the second guidance image more harmonizes in three elements "location", "brightness", and "color" with a surrounding environment which is a superimposition target than a first guidance image, only any one or two elements among the "location", "brightness", and "color" may harmonize.

In addition, the first guidance image is not limited to the above-described example as long as the first guidance image is an image related to guidance prompting the driver to change driving operation. Likewise, the second guidance image is not limited to the above-described example as long as the second guidance image is an image related to guidance not prompting the driver to change driving operation.

In addition, although in the present embodiment the configuration is such that the processes of the travel assistance processing program (FIG. 3) are performed by the navigation ECU 15 of the navigation device 3, the subject that performs those processes can be changed as appropriate. For example, the configuration may be such that a control part of the HUD 4, a vehicle control ECU, or other in-vehicle devices perform the processes. Note that when the control part of the HUD 4 performs the processes, it is also possible to form the superimposed-image display device according to the present invention using only the HUD 4.

In addition, although an implementation example in which the superimposed-image display device is embodied is described in the above description, the superimposed-image display device can also have the following configurations, and in that case the following advantageous effects are provided.

For example, a first configuration is as follows:

A superimposed-image display device (1) is mounted on a vehicle (2) and superimposes an image on a surrounding environment in front of the vehicle so that the image can be visually identified, and the image includes at least one of a first guidance image (54) that prompts a driver to change driving operation and a second guidance image (61) that does not prompt a driver to change driving operation, and the second guidance image is displayed in a display mode in which the second guidance image more harmonizes in at least one of a location, brightness, and color with the surrounding environment which is a superimposition target than the first guidance image.

According to the superimposed-image display device having the above-described configuration, even when multiple guidance images are displayed, it becomes possible to allow the driver to more clearly, visually identify a guidance image that should be visually identified upon performing a driving operation. On the other hand, it becomes possible to prevent the driver from feeling annoyed by a guidance image that is less necessary to be visually identified upon performing a driving operation.

In addition, a second configuration is as follows:

The first guidance image (54) is displayed at a location at which the first guidance image (54) is distanced upward from a road surface and visually identified, and the second guidance image (61) is displayed at a location at which the second guidance image (61) is visually identified on a road surface, by which a location of the second guidance image (61) harmonizes with a location of the road surface which is a superimposition target.

According to the superimposed-image display device having the above-described configuration, particularly for the display locations of guidance images, a guidance image that should be visually identified upon performing a driving operation is displayed at a location distanced from a road surface, by which it becomes possible to allow the driver to clearly, visually identify the guidance image. On the other hand, a guidance image that is less necessary to be visually identified upon performing a driving operation is displayed on a road surface, by which it becomes possible to prevent the driver from feeling annoyed.

In addition, a third configuration is as follows:

The second guidance image (61) is displayed in a display mode in which brightness or color of the second guidance image (61) harmonizes with brightness or color of the road surface which is a superimposition target.

According to the superimposed-image display device having the above-described configuration, a guidance image that is less necessary to be visually identified upon performing a driving operation is displayed in a display mode in which the brightness or color of the guidance image harmonizes with the brightness or color of a road surface on which the guidance image is superimposed, by which it becomes possible to prevent the driver from feeling annoyed.

In addition, a fourth configuration is as follows:

The first guidance image (54) is displayed in a different display color than a color of the surrounding environment which is a superimposition target, and the second guidance image (61) is displayed in a same or similar display color as/to a color of the surrounding environment which is a superimposition target, by which a color of the second guidance image (61) harmonizes with a color of the surrounding environment which is a superimposition target.

According to the superimposed-image display device having the above-described configuration, particularly for the display colors of guidance images, a guidance image that should be visually identified upon performing a driving operation is displayed in a different color than a location where the guidance image is superimposed, by which it becomes possible to allow the driver to clearly, visually identify the guidance image. On the other hand, a guidance image that is less necessary to be visually identified upon performing a driving operation is displayed in the same or similar color as/to that of a location where the guidance image is superimposed, by which it becomes possible to prevent the driver from feeling annoyed.

In addition, a fifth configuration is as follows:

The first guidance image (54) is displayed in a different brightness than brightness of the surrounding environment which is a superimposition target, and the second guidance image (61) is displayed in a same or similar brightness as/to brightness of the surrounding environment which is a superimposition target, by which brightness of the second guidance image (61) harmonizes with brightness of the surrounding environment which is a superimposition target.

According to the superimposed-image display device having the above-described configuration, particularly for the brightness of guidance images, a guidance image that should be visually identified upon performing a driving operation is displayed in a different brightness than a location where the guidance image is superimposed, by which it becomes possible to allow the driver to clearly, visually identify the guidance image. On the other hand, a guidance image that is less necessary to be visually identified upon performing a driving operation is displayed in the same or similar brightness as/to that of a location where the guidance image is superimposed, by which it becomes possible to prevent the driver from feeling annoyed.

In addition, a sixth configuration is as follows:

The superimposed-image display device includes: captured-image obtaining means for obtaining a captured image obtained by capturing a surrounding environment in front of a line of sight of a driver of the vehicle; map information obtaining means (41) for obtaining three-dimensional map information (34); light source location obtaining means (41) for obtaining a location of a light source (63); checking means (41) for checking the captured image against three-dimensional map information; image disposing means for disposing the first guidance image, the second guidance image, and a light source in three-dimensional map information, based on a result of the checking by the checking means; and visual identification mode obtaining means (41) for obtaining visual identification modes of the first guidance image (54) and the second guidance image (61) used when the first guidance image (54) and the second guidance image (61) are visually identified from a location of a vehicle in three-dimensional map information, and the first guidance image and the second guidance image are displayed in display modes corresponding to visual identification modes obtained by the visual identification mode obtaining means.

According to the superimposed-image display device having the above-described configuration, by using a captured image obtained by capturing a view in front of the vehicle and three-dimensional map information, it becomes possible to easily create a first guidance image and a second guidance image that have shapes and brightness that can be visually identified by the vehicle driver.

In addition, a seventh configuration is as follows:

The first guidance image (54) and the second guidance image (61) are displayed as virtual images.

According to the superimposed-image display device having the above-described configuration, it becomes possible to allow a vehicle occupant to visually identify guidance images without the vehicle occupant's line of sight moving from the front in a traveling direction as much as possible.

The invention claimed is:

1. A superimposed-image display device that is mounted on a vehicle, comprising:
a processor programmed to:
obtain a captured image of a surrounding area in front of the vehicle;
obtain three-dimensional map information;
superimpose a first guidance image that prompts a driver to change driving operation on a windshield by:
referring to the three-dimensional map information and the captured image and determining a first region for superimposition of the first guidance image;
obtaining at least one of:
a luminance value for the surrounding area in the first region;
an RGB color value for the surrounding area in the first region; and
a location of a surface in the surrounding area in the first region;
generating the first guidance image by:
setting at least one of a luminance value of the first guidance image and an RGB color value of the first guidance image to a value that is a predetermined value away from a respective one of the at least one of the luminance value for the surrounding area in the first region and the RGB color value for the surrounding area in the first region, or
setting the location of the first guidance image to be a predetermined distance away from the surface in the surrounding area in the first region; and
superimposing the generated first guidance image on the windshield; and
superimpose a second guidance image that does not prompt a driver to change driving operation on a windshield by:
referring to the three-dimensional map information and the captured image and determining a second region for superimposition of the second guidance image;
obtaining:
a luminance value for the surrounding area in the second region;
an RGB color value for the surrounding area in the second region; and
a location of a surface in the surrounding area in the second region;
generating the second guidance image by:
matching a luminance value of the second guidance image with the luminance value for the surrounding area in the second region;
matching an RGB color value of the second guidance image with the RGB color value for the surrounding area in the second region; and
matching a location of the second guidance image with the location of the surface in the surrounding area in the second region; and
superimposing the generated second guidance image on the windshield.

2. The superimposed-image display device according to claim 1, wherein the processor is programmed to:
set the location of the first guidance image to be distanced the predetermined distance upward from a road surface; and
match the location of the second guidance image to a location of the road surface.

3. The superimposed-image display device according to claim 1, wherein the processor is programmed to:
set the RGB color value of the first guidance image so that the first guidance image is displayed in a different display color than a color of the surface in the surrounding area in the first region.

4. The superimposed-image display device according to claim 1, wherein the processor is programmed to:
  obtain a location of a light source;
  check the captured image against three-dimensional map information;
  dispose the first guidance image, the second guidance image, and a light source in three-dimensional map information, based on a result of the checking;
  obtain visual identification modes of the first guidance image and the second guidance image used when the first guidance image and the second guidance image are visually identified from a location of a vehicle in three-dimensional map information; and
  display the first guidance image and the second guidance image in display modes corresponding to the obtained visual identification modes.

5. The superimposed-image display device according to claim 1, wherein the first guidance image and the second guidance image are displayed as virtual images.

6. A computer-readable storage medium storing a computer-executable program that cause a computer to execute functions, comprising:
  obtaining a captured image of a surrounding area in front of a vehicle;
  obtaining three-dimensional map information;
  superimposing a first guidance image that prompts a driver to change driving operation on a windshield by:
    referring to the three-dimensional map information and the captured image and determining a first region for superimposition of the first guidance image;
    obtaining at least one of:
      a luminance value for the surrounding area in the first region;
      an RGB color value for the surrounding area in the first region; and
      a location of a surface in the surrounding area in the first region;
    generating the first guidance image by:
      setting at least one of a luminance value of the first guidance image and an RGB color value of the first guidance image to a value that is a predetermined value away from a respective one of the at least one of the luminance value for the surrounding area in the first region and the RGB color value for the surrounding area in the first region, or
      setting the location of the first guidance image to be a predetermined distance away from the surface in the surrounding area in the first region; and
    superimposing the generated first guidance image on the windshield; and
  superimposing a second guidance image that does not prompt a driver to change driving operation on a windshield by:
    referring to the three-dimensional map information and the captured image and determining a second region for superimposition of the second guidance image;
    obtaining:
      a luminance value for the surrounding area in the second region;
      an RGB color value for the surrounding area in the second region; and
      a location of a surface in the surrounding area in the second region;
    generating the second guidance image by:
      matching a luminance value of the second guidance image with the luminance value for the surrounding area in the second region;
      matching an RGB color value of the second guidance image with the RGB color value for the surrounding area in the second region; and
      matching a location of the second guidance image with the location of the surface in the surrounding area in the second region; and
    superimposing the generated second guidance image on the windshield.

* * * * *